United States Patent
Zhen et al.

(10) Patent No.: US 11,947,469 B2
(45) Date of Patent: Apr. 2, 2024

(54) FLEXIBLE QUEUE PROVISIONING FOR PARTITIONED ACCELERATION DEVICE

(71) Applicant: XILINX, INC., San Jose, CA (US)

(72) Inventors: Cheng Zhen, San Jose, CA (US); Sonal Santan, San Jose, CA (US); Min Ma, San Jose, CA (US); Chien-Wei Lan, Santa Clara, CA (US)

(73) Assignee: XILINX, INC., San Jose, CA (US)

( * ) Notice: Subject to any disclaimer, the term of this patent is extended or adjusted under 35 U.S.C. 154(b) by 147 days.

(21) Appl. No.: 17/675,897

(22) Filed: Feb. 18, 2022

(65) Prior Publication Data

US 2023/0267080 A1 Aug. 24, 2023

(51) Int. Cl.
*G06F 13/10* (2006.01)
*G06F 13/42* (2006.01)

(52) U.S. Cl.
CPC ........ *G06F 13/102* (2013.01); *G06F 13/4221* (2013.01); *G06F 2213/0026* (2013.01)

(58) Field of Classification Search
CPC .............. G06F 13/102; G06F 13/4221; G06F 2213/0026
USPC ............................................................ 710/6
See application file for complete search history.

(56) References Cited

U.S. PATENT DOCUMENTS

| | | | |
|---|---|---|---|
| 10,572,417 B2* | 2/2020 | Pope | G06F 13/362 |
| 11,474,555 B1* | 10/2022 | Neema | G06F 13/28 |
| 2012/0151004 A1* | 6/2012 | Pope | G06Q 40/04 709/219 |
| 2012/0254587 A1* | 10/2012 | Biran | G06F 13/4022 712/34 |
| 2016/0321113 A1* | 11/2016 | Pinto | G06F 9/45558 |
| 2016/0335215 A1* | 11/2016 | Biran | G06F 9/547 |
| 2017/0109801 A1* | 4/2017 | Devendra | G06Q 30/04 |
| 2018/0095750 A1* | 4/2018 | Drysdale | G06F 9/50 |
| 2018/0219797 A1* | 8/2018 | Sen | H04L 49/109 |
| 2019/0163364 A1* | 5/2019 | Gibb | G06F 13/4295 |
| 2019/0317802 A1* | 10/2019 | Bachmutsky | G06F 9/5038 |
| 2020/0081850 A1* | 3/2020 | Singh | G06F 13/1673 |
| 2020/0314181 A1* | 10/2020 | Eran | H04L 67/10 |

* cited by examiner

*Primary Examiner* — Christopher B Shin
(74) *Attorney, Agent, or Firm* — Patterson + Sheridan, LLP (57) ABSTRACT

Embodiments herein describe partitioning an acceleration device based on the needs of each user application executing in a host. In one embodiment, a flexible queue provisioning method allows the acceleration device to be dynamically partitioned by pushing the configuration through a control command queue to the device by management software running in a trusted zone. The new configuration is parsed and verified by trusted firmware, which, then, creates isolated IO command queues on the acceleration device. These IO command queues can be directly mapped to a user application, VM, or other PCIe devices. In one embodiment, each IO command queue exposes only the compute resource assigned by the trusted firmware in the acceleration device.

20 Claims, 5 Drawing Sheets

FLEXIBLE QUEUE PROVISIONING FOR PARTITIONED ACCELERATION DEVICE

TECHNICAL FIELD

Examples of the present disclosure generally relate to partitioning resources in a system on a chip (SoC).

BACKGROUND

As acceleration devices (e.g., SoCs, field programmable gate arrays (FPGAs), graphics processor units (GPUs), application specific integrated circuits (ASICs), Smart Network Interface Controllers (SmartNICs), etc.) become more powerful, a system administrator often wants to share the compute and memory resources on the device across multiple users. Today, this can be done by statically partitioning the device into multiple PCIe functions and assigning each function to a user. However, the number of ways of partitioning the acceleration device is hard-coded and limited. Further, the system administrator cannot then re-partition the acceleration device into a different configuration during runtime as the needs of the users change.

SUMMARY

One example is an accelerator device that includes a plurality of hardware resources divided into a plurality of partitions, a plurality of input/output (IO) command queues, each assigned to a respective one of the plurality of partitions where the plurality of IO command queues provide interfaces for receiving commands to perform accelerator tasks issued by an external host, and a control command queue configured to receive commands from external management software to assign the plurality of hardware resources into the plurality of partitions.

One example described herein is a system on a chip (SoC) that includes a plurality of hardware resources divided into a plurality of partitions, a plurality of input/output (IO) command queues where each assigned to a respective one of the plurality of partitions and the plurality of IO command queues provide interfaces for receiving commands to perform accelerator tasks issued by an external host, and a control command queue configured to receive commands from external management software to assign the plurality of hardware resources into the plurality of partitions.

One example described herein is a method that includes advertising a control command queue in an acceleration device to external management software, receiving, at the control command queue, commands for establishing IO command queues, allocating the IO command queues, wherein each of the IO command queues corresponds to a respective partition formed from hardware resources in the acceleration device, and informing designated applications executing in a host coupled to the acceleration device that the IO command queues have been allocated.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe partitioning an acceleration device based on the needs of each user and the functionality provided by the bitstream on the device, while still maintaining the efficiency and security obtained from static partitioning. In one embodiment, a flexible queue provisioning method allows the acceleration device to be dynamically partitioned by pushing the configuration through a control queue to the device by management software running in a trusted zone. The new configuration is parsed and verified by trusted firmware, which, then, creates isolated IO command queues on the acceleration device. These IO command queues can be directly mapped to user application space, a VM, or to other PCIe devices. In one embodiment, each IO command queue exposes only the compute resource assigned by the trusted firmware in the acceleration device.

Figure 1:
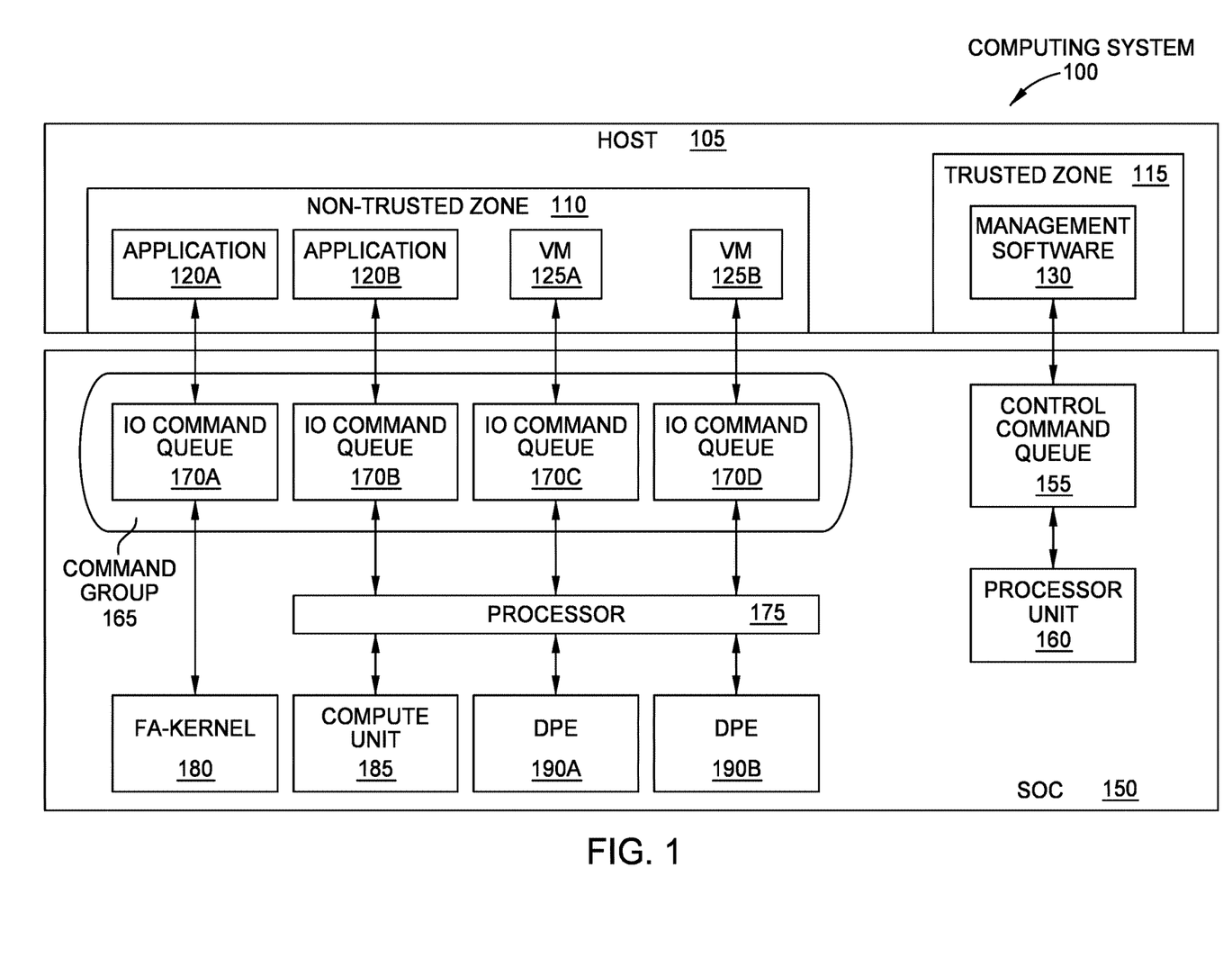
FIG. 1 is a SoC with IO command queues for partitioning hardware in the SoC, according to an example.

FIG. 1 is a SoC 150 with IO command queues 170 for partitioning hardware in the SoC 150, according to an example. FIG. 1 illustrates a computing system 100 that includes a host 105 (e.g., a server, blade server, desktop, etc.) communicatively coupled to the SoC 150 using, e.g., a PCIe connection. In one embodiment, the SoC 150 is an acceleration device that has hardware for performing tasks assigned by the host 105. For example, the SoC 150 may include a heterogeneous processing system with different types of processing elements such as compute units (CUs) 185, fast adapter (FA) kernels 180, processors 175 with any number of processing cores, data processing engines (DPEs) 190, and processors implemented using programmable logic (not shown). The SoC 150 can be used to perform any number of acceleration tasks such as artificial intelligence acceleration, cryptography, compression, graphic acceleration, data processing for radio frequency (RF) applications, and the like.

In this example, the SoC 150 is a heterogeneous processing system since the SoC 150 has different types of processing elements such as the CU 185, DPE 190, FA-kernel 180, and the processor 175. The partitions in the SoC 150 can include only the same type of processing elements, or a mix of the processing elements. In FIG. 1, the four partitions all have the same type of processing elements, but in other embodiments, a partition could have different types of processing elements—e.g., one partition could have the CU 185 and one of the DPEs 190.

The host 105 includes a non-trusted zone 110 and a trusted zone 115. The trusted zone 115 includes management software (e.g., the hypervisor in the host 105) that is tasked with partitioning the hardware in the SoC 150. In one embodiment, the system administrator knows the number and demands of applications 120 and/or virtual machines (VMs) 125 in the host 105 and can send commands, using the management software 130, to partition the SoC 150 to suit the needs of the applications 120 and VMs 125 (e.g., user software entities).

In this example, the FA-kernel 180 is assigned (or dedicated) to the application 120A while the compute unit 185 is assigned to the application 120B. The DPE 190A is assigned to the VM 125A while the DPE 190B is assigned to the VM 125B. Thus, FIG. 1 illustrates that the hardware resources in the SoC 150 can be assigned at the application-level or the VM-level to the software entities (i.e., user entities) executing in the host 105.

In one embodiment, only software executing in the trusted zone 115 (e.g., the management software 130) is permitted to partition the SoC 150, while the applications 120 and VMs 125 in the non-trusted zone 110 are not. For example, the management software 130 may have root privilege while the software in the non-trusted zone 110 does not. While FIG. 1 illustrates the host 105 having the management software 130, in other embodiments (such as a data center deployment), the management software 130 can be located on a different computing system from the host 105, such as a central location which executes the management software for all the acceleration devices in the data center.

The SoC 150 includes a control command queue 155 that receives commands for partitioning the hardware in the SoC 150 from the management software 130. Trusted firmware in a processor unit 160 reads the commands in the control command queue 155 and then generates the input/output (IO) command queues 170 in response to those commands. In this example, the trusted firmware in the processor unit 160 generates an IO command queue for each application 120 and VM 125 in the host 105. Thus, each application 120 and VM 125 can have access to dedicated hardware resources in separate partitions. Stated differently, the hardware resource assigned to one application or VM is not accessible to any other application or VM.

The IO command queues 170 are arranged in a command queue group 165 which defines how the applications 120 and VMs 125 can submit tasks to the SoC 150, in one embodiment, the IO command queues 170 (as well as the control command queue 155) are ring buffers where the host 105 is a producer that pushes commands into these buffers and the hardware resources in the SoC 150 are the consumers tasked with executing these commands. That is, the IO command queues 170 provide interfaces for receiving commands to perform accelerator tasks issued by the applications 120 and VMs 125 in the external host 105. Once the accelerator tasks are complete, the consumers can push completion messages or completion results onto the ring buffers to let the producers know that the tasks are complete.

Some of the hardware resources in the SoC 150 are able to directly communicate with the group 165 of IO command queues 170 while others are not. In this example, the FA-kernel 180 includes a wrapper that permits it to interpret and process the commands in the IO command queue 170A. In contrast, the CU 185 and the DPEs 190 are not. Instead, the CU 185 and the DPEs 190 rely on firmware or software executing in a processor 175 to be a go-between the IO command queues 170B-D and the CU 185 and the DPEs 190. For example, the processor 175 (or a processor subsystem) can be a generic processor that executes a lightweight operating system (OS) or firmware that can be programmed to interface with the IO command queues 170. The processor 175 can then convert the commands in the queues 170 to instructions to the CU 185 and the DPEs 190. Once the CU 185 and the DPEs 190 complete the tasks, the processor 175 can post the results to the command queues 170.

In one embodiment, the IO command queues 170 are implemented using shared memory in the SoC 150. The processor unit 160 can then divide the shared memory into the IO command queues 170. Although not shown, the processor unit 160 can also configure memory protection circuitry for preventing a hardware resource from accessing an IO command queue 170 it is not assigned. For example, memory protection circuitry can prevent the CU 185 or the DPEs 190 from accessing the IO command queue 170A that is assigned to the FA-kernel 180.

Moreover, while FIG. 1 illustrates implementing the IO command queues 170 in memory in the SoC 150, in other embodiments the queues 170 can be implemented in memory in the host 105. In that case, the management software 130 can inform the processor unit 160, using the control command queue 155, the location of the memory in the host 105. The processor unit 160 can then partition the memory to form the IO command queues 170.

Figure 2:
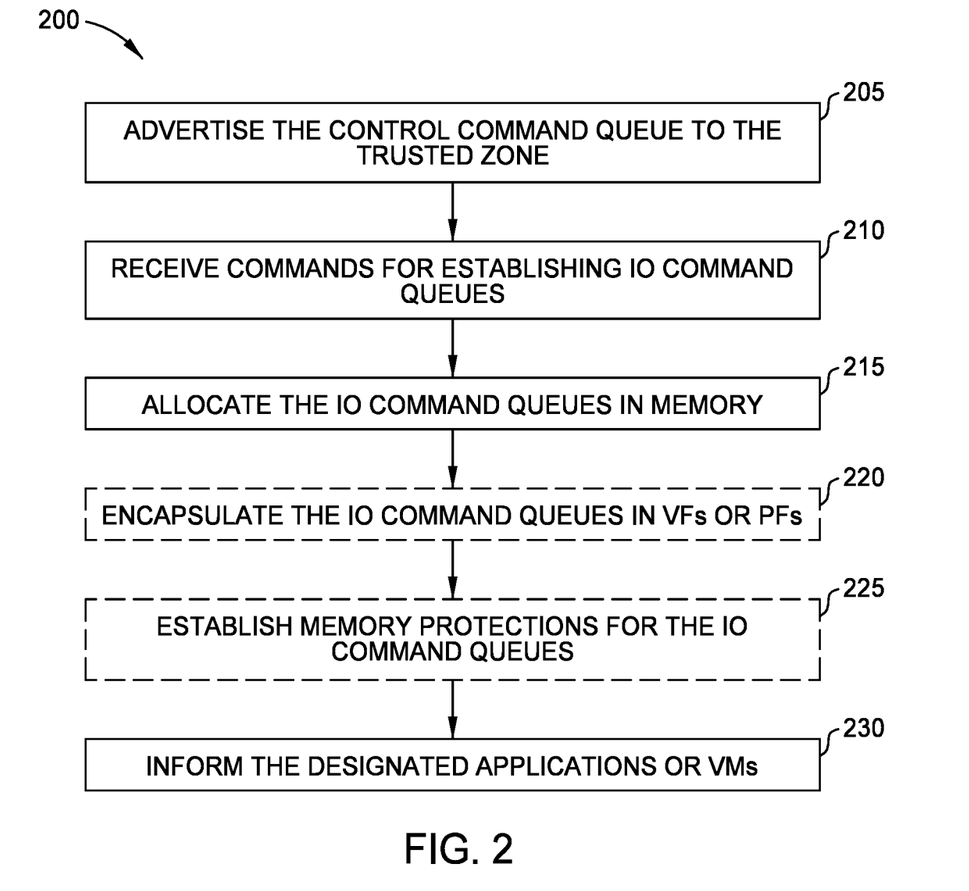
FIG. 2 is a flowchart for partitioning hardware in a SoC or acceleration device, according to examples.

FIG. 2 is a flowchart of a method 200 for partitioning hardware in a SoC or acceleration device, according to examples. At block 205, the SoC advertises the control command queue to the trusted zone of the host or a central controller in a data center that has the management software. As shown in FIG. 1, at boot time, the processor unit 160 can advertise the control command queue 155 to the management software 130, whether that software 130 is on the host 105 or some other location in a data center. The management software 130 can receive those advertisements and recognize that the SoC 150 is an acceleration device which it can dynamically partition.

At block 210, the SoC receives commands for establishing the IO command queues. That is, the SoC receives commands from external management software at the control command queue. The commands can indicate the types and number of hardware resources in the SoC that should be assigned to a respective user software entity in the host. For example, the commands can indicate how many of the DPEs in the SoC should be assigned to a first user application and how many of the DPEs should be assigned to a second user application, or how many CUs should be assigned to a first VM in the host and how many CUs should be assigned to a second VM in the host. In this manner, the commands received from the management software provide instructions that the processor unit can use to partition the hardware resources in the SoC and to which software entities in the host those partitions should be assigned.

At block 215, the SoC allocates the IO command queues in memory. In one embodiment, the processor unit in the SoC allocates the IO command queues to portions of shared memory in the SoC. The processor unit can then configure the hardware resources to communicate with the IO command queues to receive commands from the user applications or VMs. In one embodiment, the processor unit configures the hardware resource to communicate with the IO command queues directly if they are able. Using FIG. 1 as an example, the FA-kernel 180 is able to communicate directly with the IO command queue 170A while the CU 185 and the DPEs 190 are not capable of communicating directly with the IO command queues 170B-D. Instead, the CU 185 and the DPEs 190 rely on the processor 175 to serve as an intermediary. For example, the processor 175 may include an embedded OS or firmware that is capable of interpreting the commands posted in the IO command queues 170 and forwarding those commands to the CU 185 and the DPEs 190.

While FIG. 1 illustrates using the same processor 175 as an intermediary for the CU 185 and the DPEs 190, in other embodiments multiple processor elements can be used. For example, instead of using the processor 175 (e.g., a hardened processor), a processor implemented in programmable logic may be used as the intermediary between the CU 185 and the IO command queue 170B.

Moreover, as discussed above, the IO command queues can be established in memory in the host rather than in the SoC. In that case, the management software can inform the processor unit, using the control command queue, where the location of the memory is in the host. The processor unit can then partition the memory to form the IO command queues.

Block 220 is an optional block as indicated by the hatching. At block 220, the SoC encapsulates the IO command queues in virtual functions (VFs) or physical functions (PFs). In one embodiment, the VFs expose the partitioned hardware resources to the user applications or VMs. Stated differently, the VFs can be advertised to user applications and VMs to identify the corresponding hardware resources assigned to that VF and IO command queue. In one embodiment, each of the IO command queues can be encapsulated by a respective VF while the control command queue is part of a PF.

However, encapsulating the IO command queues in VFs is not necessary. Alternatively, in a data center or cloud environment, a virtualized back-end driver can be used in the host to multiplex across the IO command queues. That is, the driver in the host can direct the traffic received from the applications and VMs in the host to their assigned IO command queue and partitioned hardware resources. Again using FIG. 1 as an example, the back-end driver can route traffic received from the application 120A to the IO command queue 170A and traffic received from the application 120B to the IO command queue 170B. In one embodiment, the driver executes in the hypervisor in the host to funnel or multiplex the commands generated by the applications 120 and VMs 125 to the appropriate IO command queue 170.

In a non-data center environment, the management software can map the IO command queues directly to the applications 120 and VMs 125 without using a back-end driver to multiplex the commands. That way, the applications 120 and VMs 125 can communicate directly with their respective IO command queues 170. Further, the management software can ensure the applications 120 and VMS 125 do not send commands to queues 170 designated for a different application or VM.

Regardless whether the IO command queues are, or are not, encapsulated in VFs or PFs, once the applications and VMs in the host are made aware of the IO command queues, they can communicate directly with the IO command queues.

Block 225 is another optional block as indicated by the hatching. At block 225, the SoC establishes memory protections for the IO command queues. In one embodiment, the SoC includes memory protection circuitry that can ensure only certain hardware elements in the SoC can access the IO command queues. For example, in FIG. 1, the memory protection circuitry may ensure only the FA-kernel 180 can access the IO command queue 170A or that only the CU 185 (via the processor 175) can access the IO command queue 170B. Doing so may further protect a rogue actor from using a hardware resource in a first partition in the SoC to access data corresponding to a second partition in the SoC.

While the memory protection circuitry can improve security, it is not a requirement. Instead, the SoC can rely on the configuration or assignments made by the processor unit to ensure a hardware resource in one partition does not access data in another partition.

At block 230, the SoC informs the designated applications how to communicate with the IO command queues. If the queues are encapsulated in VFs, the SoC can pass through the VF as a new PCIe device to the application or VM in the host. The application or VM will see the new PCIe device and the underlying partitioned resource. For example, when the VM 125A discovers the IO command queue 170C, it sees only the DPE 190A but not the other DPE 190B, the FA-kernel 180, or the CU 185.

In this manner, the applications and/or s in the host can be made aware of the IO command queues and their underlying partitioned hardware resources. However, the applications and VMs are not made aware of the IO command queues and the partitioned hardware resources that are not assigned to them. During operation, the applications and VMs can submit commands to their respective IO command queues which then instruct the underlying hardware resources to execute those commands. Once finished, the hardware resources can push responses on the IO command queues which can then be retrieved by the application or VM in the host.

Further, the method 200 can repeat where the management software in the trusted zone can change the partitions in the SoC on the fly (i.e., during runtime). For example, the host may spin down one of the VMs or applications that was assigned one of the hardware partitions in the SoC. In response, the management software can provide updated commands to the control command queue which the processor unit then uses to delete or deactivate the IO command queue corresponding to the partition that was used by the spun down VM or application. Further, the processor unit can reassign the hardware resources in that partition to the other partitions in the SoC that are still being used, thereby establishing a different set of partitions in the SoC.

In another example, the host may spin up another VM or application and want to assign a new partition in the SoC to the new VM or application. Again, the management software can provide updated commands to the control command queue which the processor unit then uses to allocate a new IO command queue corresponding to a new partition that can then be advertised to the new VM or application. Assuming there are not unused hardware resources in the SoC, hardware resources from an already existing partition (or partitions) can be used to provide resources for the new partition. Using FIG. 1 as an example, the DPEs 190A and 190B can each include eight differently assignable DPEs.

The commands may instruct the processor unit 160 to take one or more of the DPEs in the DPEs 190A and 190B to assign to the new partition and IO command queue. This new queue and hardware resources can then be assigned to the new VM or application in the host. In this manner, the hardware resources in the SoC 150 can be repartitioned during runtime to either add new partitions or delete old partitions. The underlying hardware resources in those partitions can be reassigned accordingly.

Figure 3:
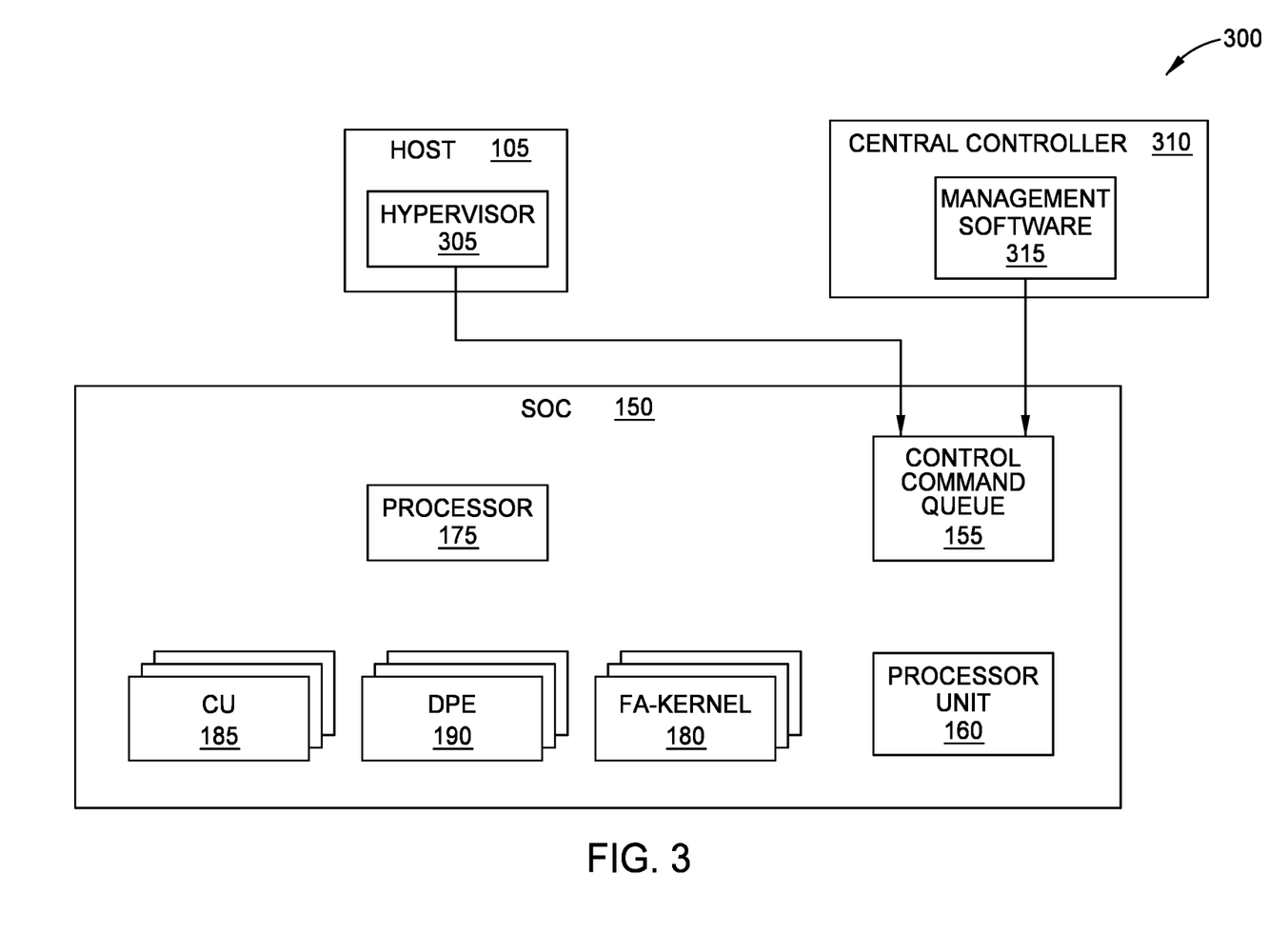
FIG. 3 illustrates a SoC before partitioning its hardware, according to an example.

FIG. 3 illustrates a SoC 150 before partitioning its hardware, according to an example. In one embodiment, FIG. 3 illustrates the configuration of the SoC 150 before the ID command queues have been allocated. For example, FIG. 3 can illustrate the state of the SoC 150 before block 215 in the method 200 where the IO command queues are established.

As shown, the SoC 150 advertises the control command queue 155. FIG. 3 illustrates two possible embodiments where the management software 315 can be implemented in a central controller 310 or in the hypervisor 305 of the host 105. If the former, the central controller 310 can have management software 315 for configuring all the accelerator devices, such as all the SoCs 150 in a data center or a cloud computing environment. The central controller 310 can be a computing system such as a server or a virtual machine that has communication paths to the acceleration devices. The management software 315 can then use the control command queue 155 to partition the SoC 150 as discussed above.

Alternatively, the hypervisor 305 can serve as the management software to partition the SoC 150 by posting commands in the control command queue 155. Regardless of whether the management software is in the host 105 or the central controller 310, the control command queue 155 can be used to receive the commands that then can be performed by the processor unit 160 to partition the hardware resources in the SoC 150.

As shown, the SoC 150 includes a plurality of CUs 185, DPEs 190, and FA-kernels 180. Before being partitioned, the hardware resources may all be accessible to the host 105. For example, the applications and VMs in the host 105 can use all the hardware resources. However, once the resources are partitioned as shown in FIG. 1 using a corresponding IO command queue, the hardware resources are then accessible by only one of the applications or VMs in the host 105.

Figure 4:
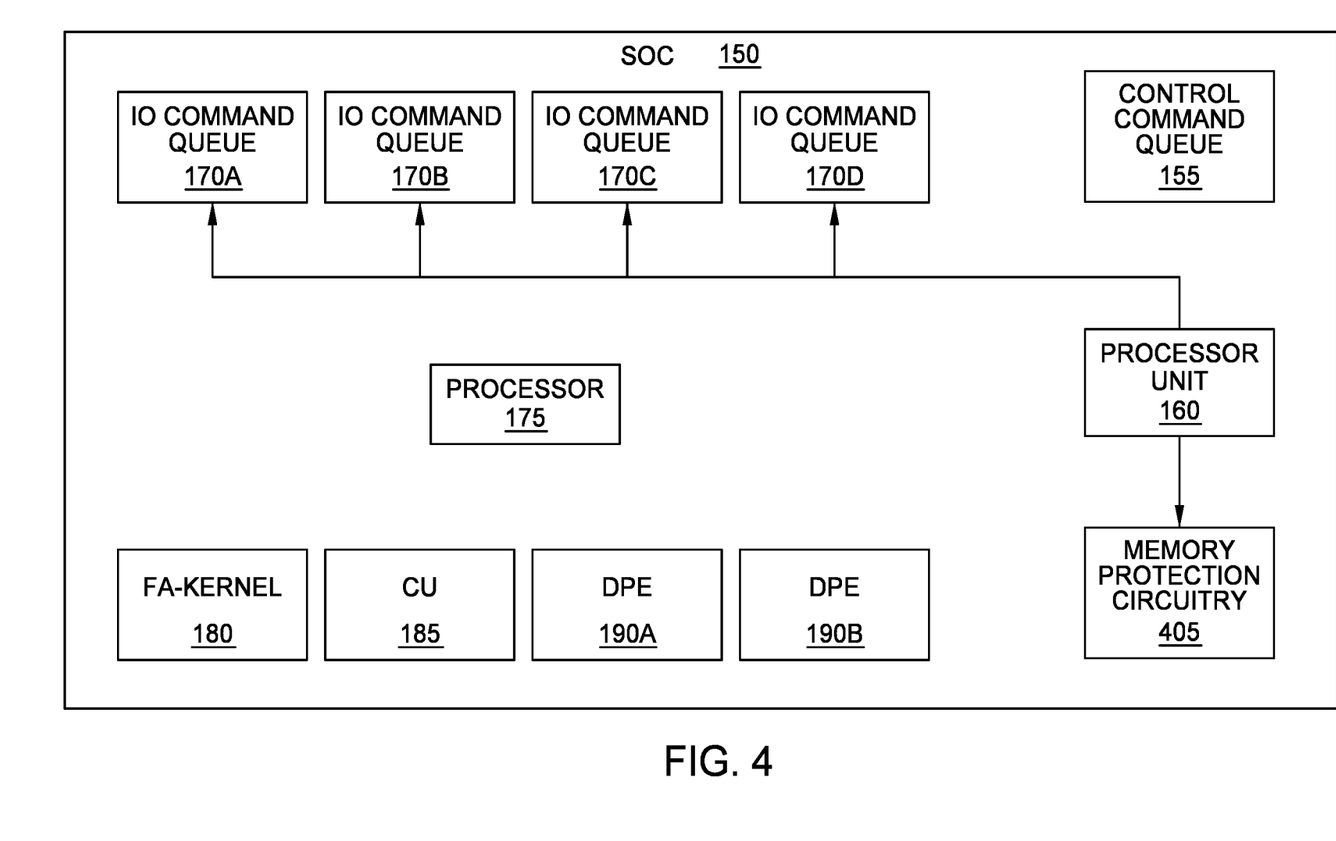
FIG. 4 illustrates a SoC after establishing IO command queues that partition its hardware, according to one embodiment.

FIG. 4 illustrates the SoC 150 after establishing IO command queues that partition its hardware, according to one embodiment. In one embodiment, FIG. 4 illustrates the configuration of the SoC 150 after the IO command queues have been allocated. For example, FIG. 4 can illustrate the state of the SoC 150 after block 215 in the method 200 where the IO command queues are established.

As shown, the processor unit 160 uses the commands in the control command queue 155 to allocate and establish the IO command queues 170. Further, the trusted firmware in the processor unit 160 indicates which hardware resource corresponds to which of the queues 170. Doing so partitions the hardware resources in the SoC 150. In this example, the FA-kernel 180 is a first hardware partition that is accessible via the IO command queue 70A, the CU 185 is a second hardware partition that is accessible via the IO command queue 170B, the DPE 190A is a third hardware partition that is accessible via the IO command queue 1700, and the DPE 1906 is a fourth hardware partition that is accessible via the IO command queue 170D. In contrast in FIG. 3 where these hardware resources are not separated into different partitions, in FIG. 4, the processor unit 160 has assigned at least some of the hardware resources into different partitions having separate IO command queues 170.

Further, FIG. 4 illustrates the processor unit 160 configuring memory protection circuitry 405 to prevent data sharing between the partitions. In one embodiment, the memory protection circuitry 405 prevents a hardware resource in a first partition from accessing an IO command queue 170 in a different partition. For example, the memory protection circuitry 405 may prevent the CU 185 from accessing any of the IO command queues except for the queue 170B. Thus, the memory protection circuitry 405 can prevent hardware resources in different partitions from reading or altering data assigned to a different partition.

Figure 5:
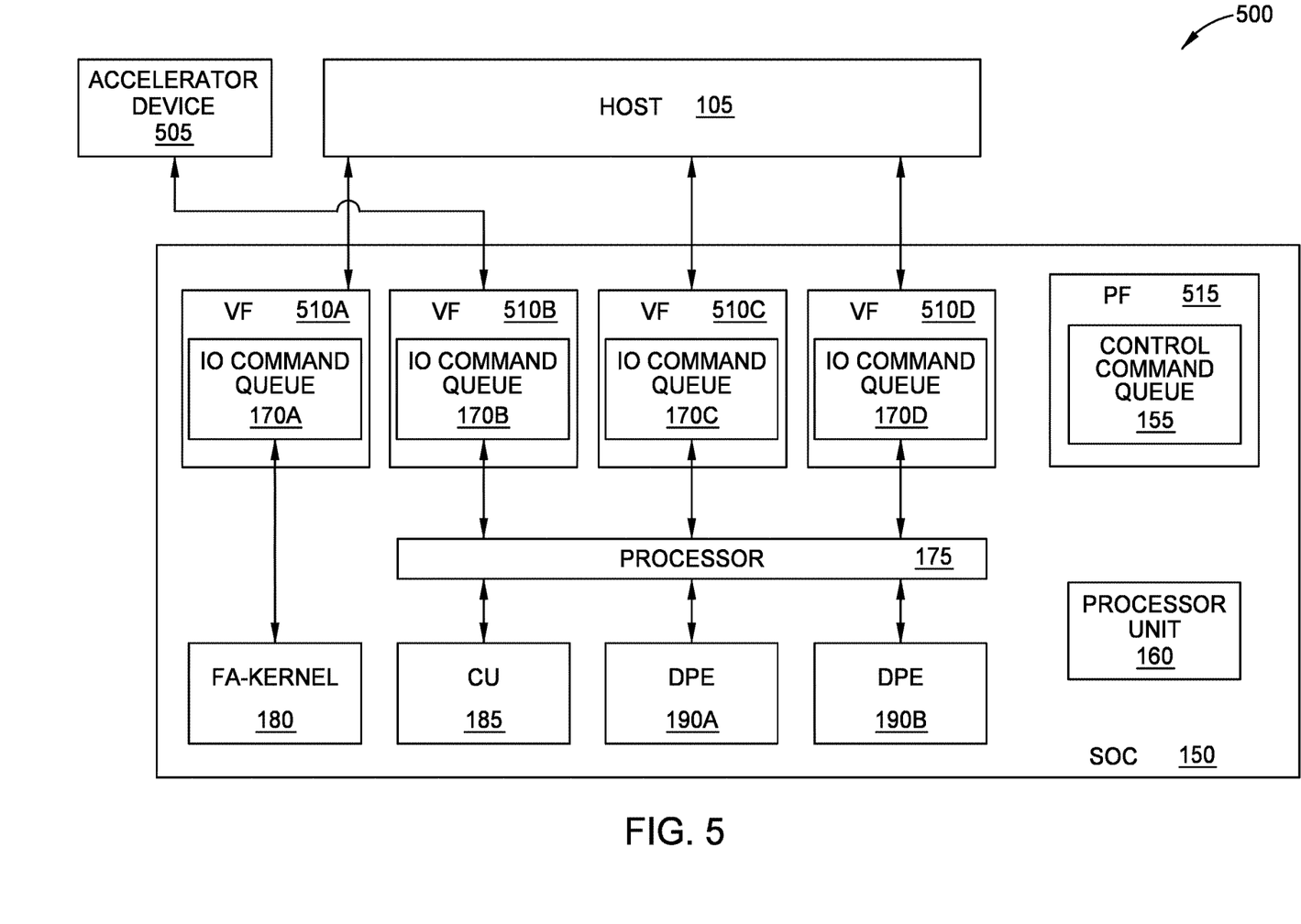
FIG. 5 illustrates a SoC with IO command queues encapsulated by virtual or physical functions, according to one embodiment.

FIG. 5 illustrates a SoC 150 with IO command queues 170 encapsulated by VFs 510 or PFs, according to one embodiment. The SoC 150 is partitioned like the SoC 150 illustrated in FIG. 4 but also includes the VFs 510 which encapsulate the queues 170. As mentioned above, the VFs 510 can be used to advertise the four partitions in the SoC 150 as four new PCIe devices to the host 105. These partitions can then be assigned to a respective application or VM (not shown) in the host 105. Once the partitions are assigned to an application or VM in the host 105, the application or VM can then communicate directly with the IO command queue 170 to provide commands that are then executed by the hardware resource or resources in that partition.

In addition to encapsulating the IO command queues 170 in the VFs 510A-D, the control command queue 155 is encapsulated by a PF 515. The PF 515 can be used to advertise the control command queue 155 to management software in a trusted zone. As shown in FIG. 3, the management software can be a hypervisor in the host 105, or can be part of a central controller in a data center or cloud computing environment.

FIG. 5 also illustrates that the SoC 150 can be used by another acceleration device along with being used by the applications and VMs in the host 105. FIG. 5 includes accelerator device 505 which may be connected to the SoC 150 using a PCIe connection. In one embodiment, the accelerator device 505 can use the peer-to-peer (P2P) portion of the PCIe standard to communicate with the SoC 150. As shown, the accelerator device 505 is assigned the partition that includes the IO command queue 170B and the CU 185. This means the accelerator device 505 can submit commands to the IO command queue 170B which are then executed by the CU 185. As such, FIG. 5 illustrates that the hardware partitions in the SoC 150 can be assigned to user software entities in the host 105 (which is the case for the partitions containing the IO command queues 170A, 170C, and 170D) as well as to peer PCIe accelerator devices such as the accelerator device 505.

The accelerator device 505 can be a SoC, FPGA, GPU, ASIC, SmartNIC, etc. The accelerator device 505 can be the same type of accelerator device as the SoC 150, or can be used to accelerate the same type of functions. For example, both the SoC 150 and the accelerator device 505 can be AI accelerators. In other embodiments, the accelerator device 505 and the SoC 150 can be different types of accelerators—e.g., one is a FPGA while the other is a SmartNIC.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An accelerator device, comprising:
   a plurality of hardware resources;
   a control command queue configured to receive commands from external management software;

a plurality of input/output (IO) command queues that provide interfaces for receiving commands to perform accelerator tasks issued by an external host; and a processor unit configured to:
  assign, using the commands received in the control command queue, the plurality of hardware resources into a plurality of partitions;
  assign each of the plurality of IO command queues to a respective one of the plurality of partitions; and
  configure the plurality of hardware resources to communicate with the plurality of IO command queues, wherein configuring the plurality of hardware resources comprises:
    configuring a first hardware resource, of a first partition of the plurality of partitions, to directly access a first IO command queue assigned to the first partition; and
    configuring a separate processor to convert commands, of a second IO command queue assigned to a second partition of the plurality of partitions, into instructions for a second hardware resource of the second partition.

2. The accelerator device of claim 1, wherein at least a first one of the plurality of IO command queues is assigned to a software entity in the host, wherein the software entity in the host comprises a user application or a virtual machine.

3. The accelerator device of claim 2, wherein at least a second one of the plurality of IO command queues is assigned to a different accelerator device via a peer-to-peer (P2P) PCIe connection.

4. The accelerator device of claim 1, wherein hardware resources in a first partition of the plurality of partitions cannot access the IO command queues assigned to different partitions of the plurality of partitions.

5. The accelerator device of claim 4, further comprising:
  memory protection circuitry configured to, in response to the commands received from the external management software, prevent data for the plurality of partitions to be shared with hardware resources in a different partition.

6. The accelerator device of claim 1, wherein the plurality of hardware resources form a heterogeneous processing system with different types of processing elements.

7. The accelerator device of claim 1, wherein the processor unit is further configured to, at boot time, use the commands received from the external management software to allocate the plurality of IO command queues and establish the plurality of partitions.

8. The accelerator device of claim 7, wherein the processor unit is further configured to, at runtime, use additional commands received from the external management software to alter the plurality of partitions and the plurality of IO command queues to form a different set of partitions.

9. The accelerator device of claim 1, further comprising:
  a plurality of virtual functions, each encapsulating a respective one of the plurality of IO command queues.

10. A system on a chip (SoC), comprising:
  a plurality of hardware resources;
  a control command queue configured to receive commands from external management software;
  a plurality of input/output (IO) command queues that provide interfaces for receiving commands to perform accelerator tasks issued by an external host; and
  a processor unit configured to:
    assign, using the commands received in the control command queue, the plurality of hardware resources into a plurality of partitions;
    assign each of the plurality of IO command queues to a respective one of the plurality of partitions; and
    configure the plurality of hardware resources to communicate with the plurality of IO command queues, wherein configuring the plurality of hardware resources comprises:
      configuring a first hardware resource, of a first partition of the plurality of partitions, to directly access a first IO command queue assigned to the first partition; and
      configuring a separate processor to convert commands, of a second IO command queue assigned to a second partition of the plurality of partitions, into instructions for a second hardware resource of the second partition.

11. The SoC of claim 10, wherein each of the plurality of IO command queues is assigned to a different software entity in the host, wherein the software entities in the host comprise user applications or virtual machines.

12. The SoC of claim 10, wherein hardware resources in a first partition of the plurality of partitions cannot access the IO command queues assigned to different partitions of the plurality of partitions.

13. The SoC of claim 12, further comprising:
  memory protection circuitry configured to, in response to the commands received from the external management software, prevent data for the plurality of partitions to be shared with hardware resources in a different partition.

14. The SoC of claim 10, wherein the plurality of hardware resources can form a heterogeneous processing system with different types of processing elements.

15. The SoC of claim 10, wherein the processor unit is further configured to, at boot time, use the commands received from the external management software to allocate the plurality of IO command queues and establish the plurality of partitions.

16. The SoC of claim 15, wherein the processor unit is further configured to, at runtime, use additional commands received from the external management software to alter the plurality of partitions and the plurality of IO command queues to form a different set of partitions.

17. The SoC of claim 10, further comprising:
  a plurality of virtual functions, each encapsulating a respective one of the plurality of IO command queues.

18. A method comprising:
  advertising a control command queue in an acceleration device to external management software;
  receiving, at the control command queue, commands for establishing IO command queues;
  allocating the IO command queues, wherein each of the IO command queues corresponds to a respective partition of a plurality of partitions formed from hardware resources in the acceleration device, wherein allocating the IO command queues comprises:
    configuring a first hardware resource, of a first partition of the plurality of partitions, to directly access a first IO command queue assigned to the first partition; and
    configuring a separate processor to convert commands, of a second IO command queue assigned to a second partition of the plurality of partitions, into instructions for a second hardware resource of the second partition; and
  informing designated applications executing in a host coupled to the acceleration device that the IO command queues have been allocated.

19. The method of claim 18, further comprising:
encapsulating each of the IO command queues in a respective virtual function; and
advertising the virtual functions as new PCIe devices to the designated applications executing in the host.

20. The method of claim 18, further comprising:
establishing memory protections in the acceleration device for the IO command queues to prevent hardware resources in one of the partitions from accessing data assigned to a different partition.

\* \* \* \* \*